Figure 12:
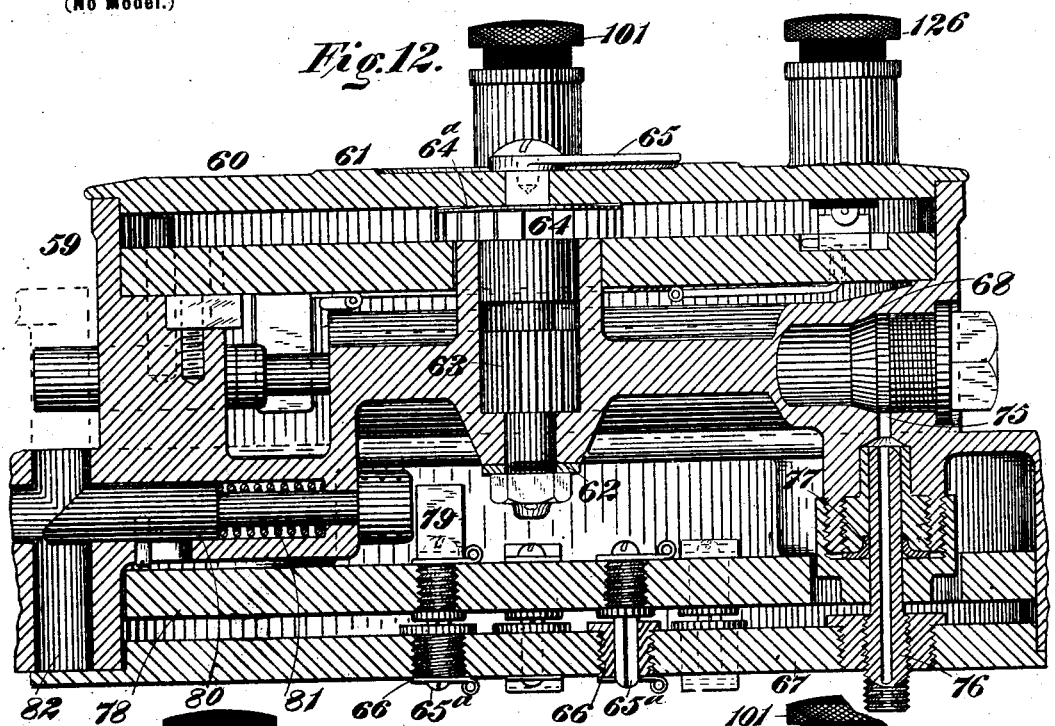

No. 624,277. Patented May 2, 1899.
G. WESTINGHOUSE.
ELECTROPNEUMATIC CONTROLLING SYSTEM.
(Application filed Aug. 20, 1898.)
(No Model.) 12 Sheets—Sheet 1.
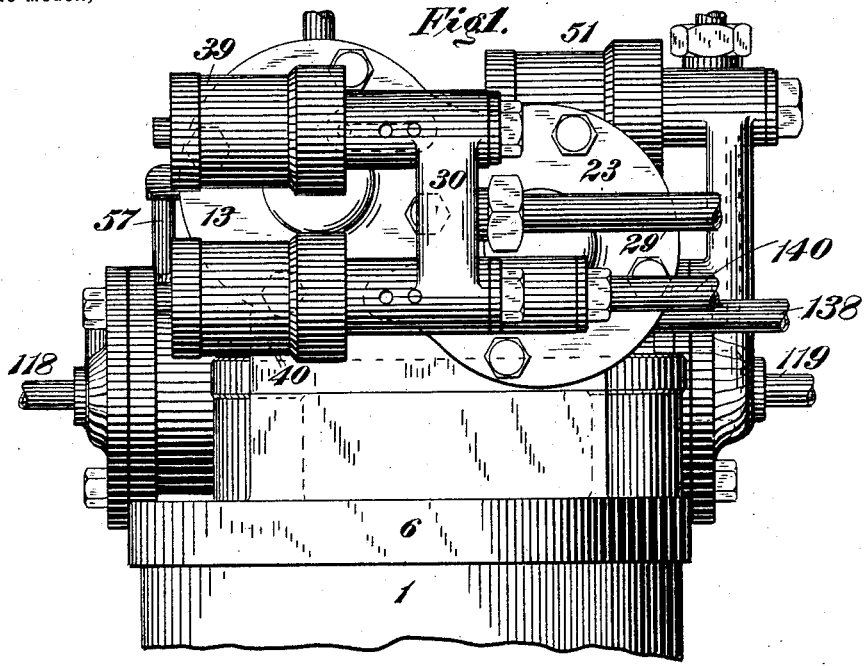
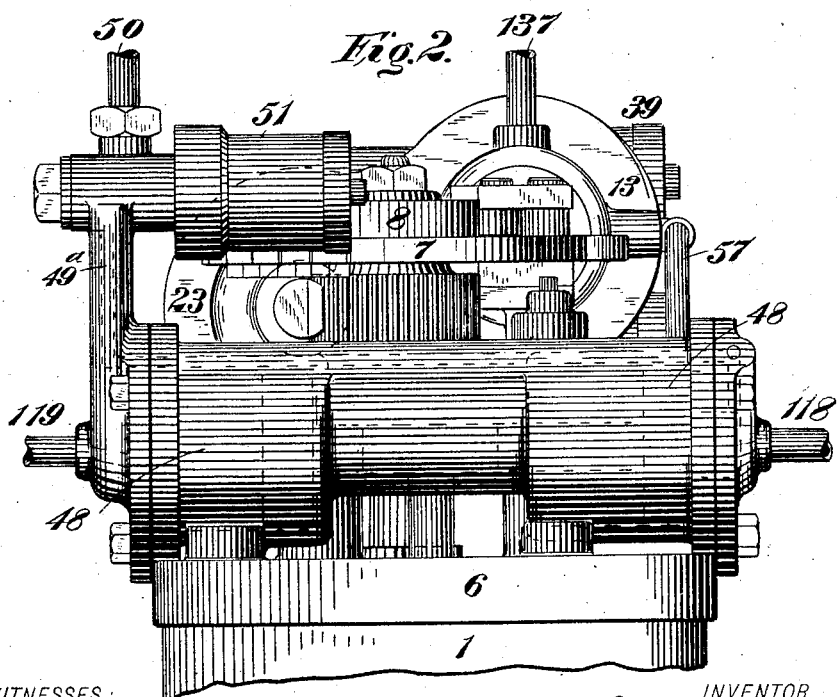
WITNESSES:
Ethan D. Dodds
Edward Ball
INVENTOR
George Westinghouse
BY Wesley G. Carr
ATTORNEY.

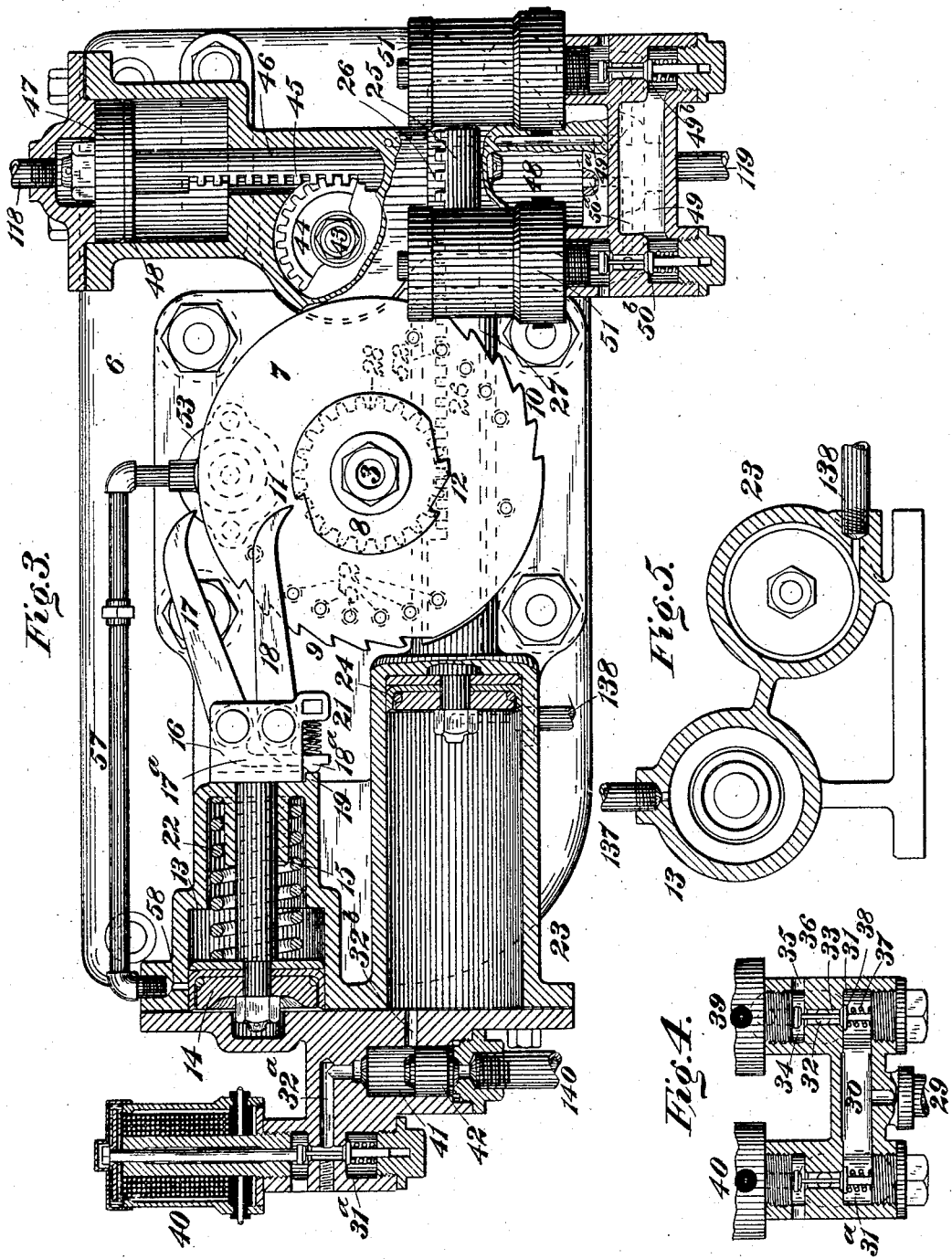

No. 624,277. Patented May 2, 1899.
G. WESTINGHOUSE.
ELECTROPNEUMATIC CONTROLLING SYSTEM.
(Application filed Aug. 20, 1898.)
(No Model.) 12 Sheets—Sheet 3.
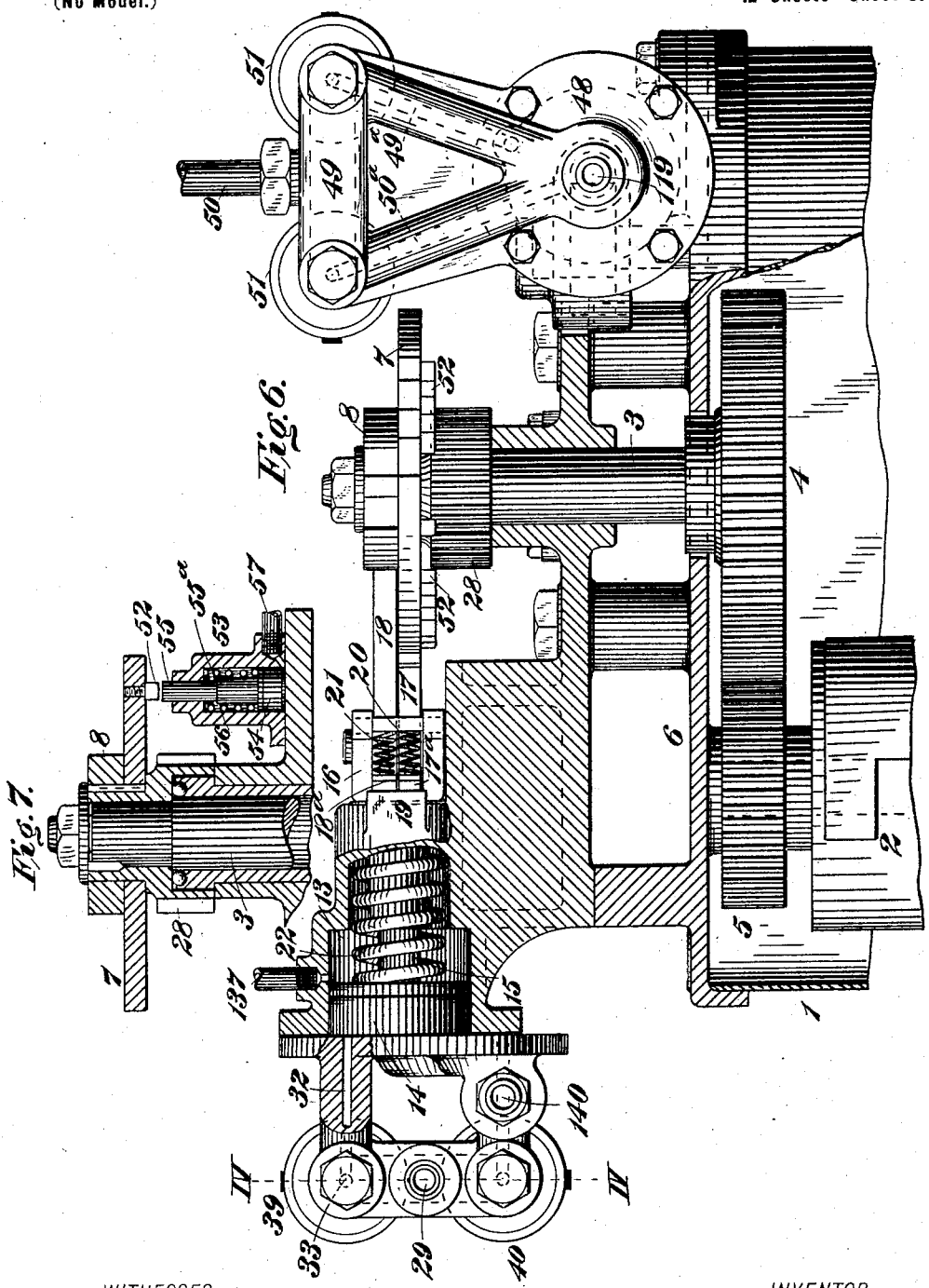
WITNESSES:
INVENTOR,
George Westinghouse
BY
ATTORNEY.

No. 624,277.  
G. WESTINGHOUSE.  
ELECTROPNEUMATIC CONTROLLING SYSTEM.  
(Application filed Aug. 20, 1898.)  
Patented May 2, 1899.
(No Model.)  
12 Sheets—Sheet 4.
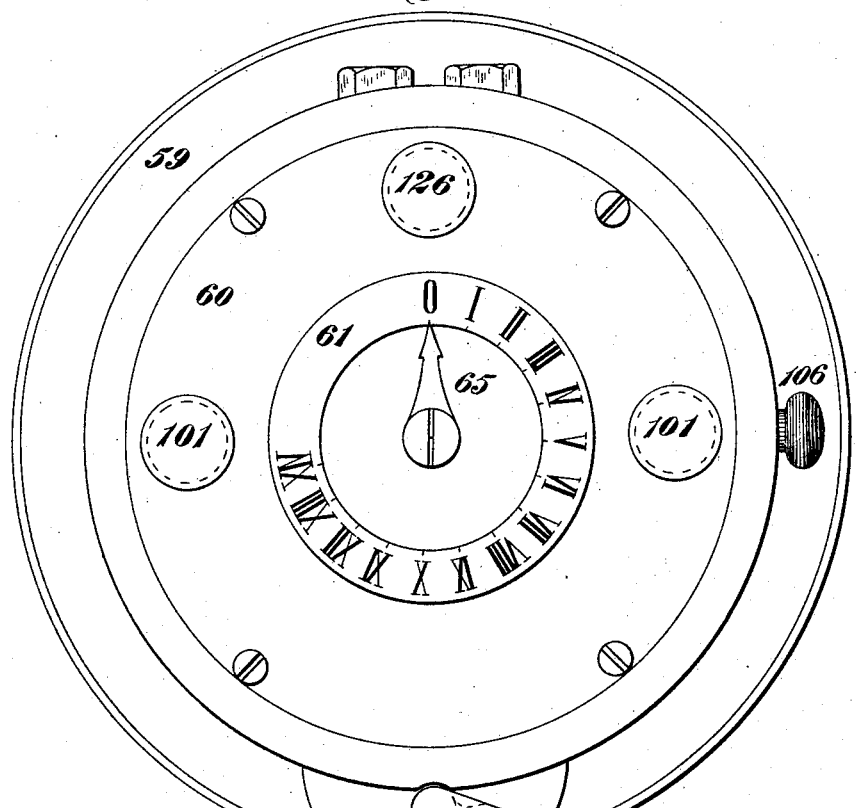
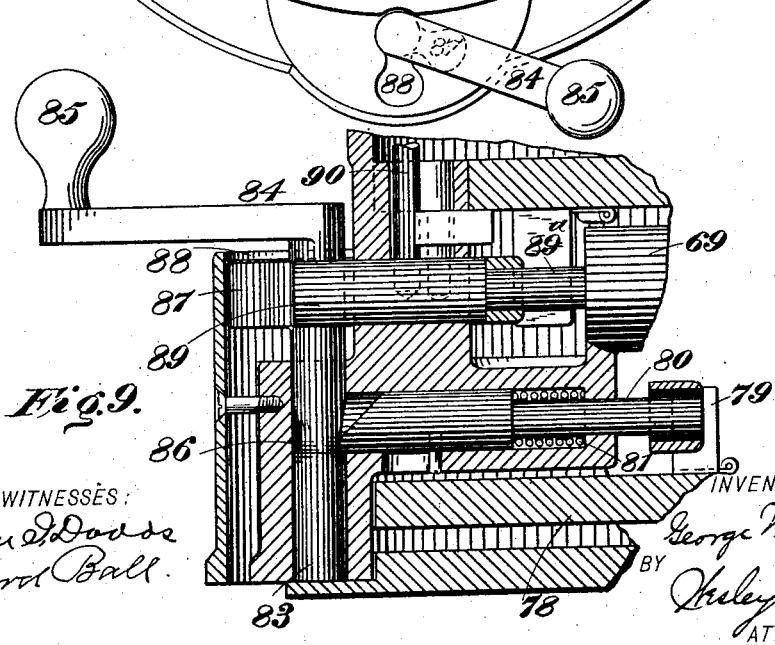
WITNESSES:  
INVENTOR  
George Westinghouse  
BY  
ATTORNEY.

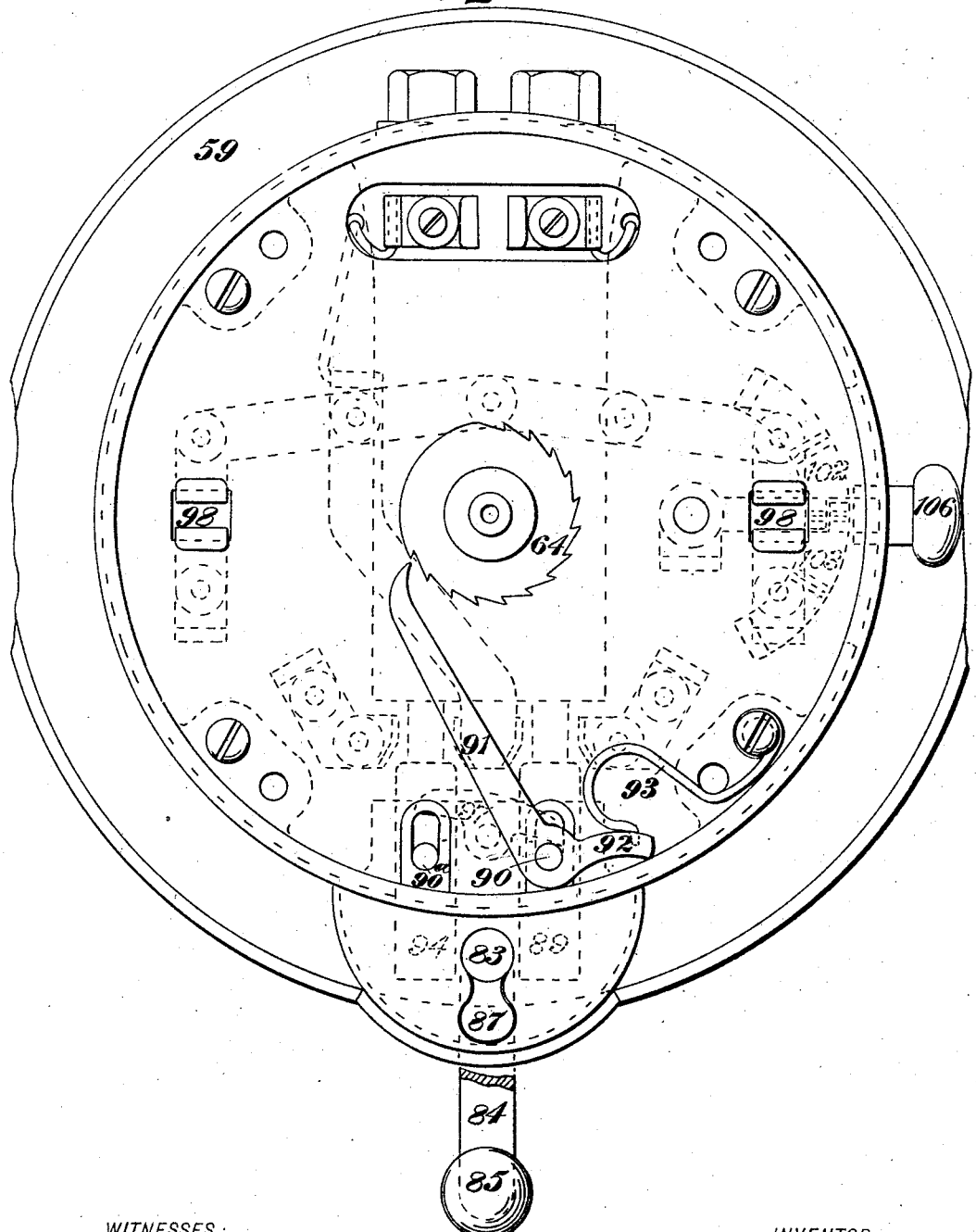

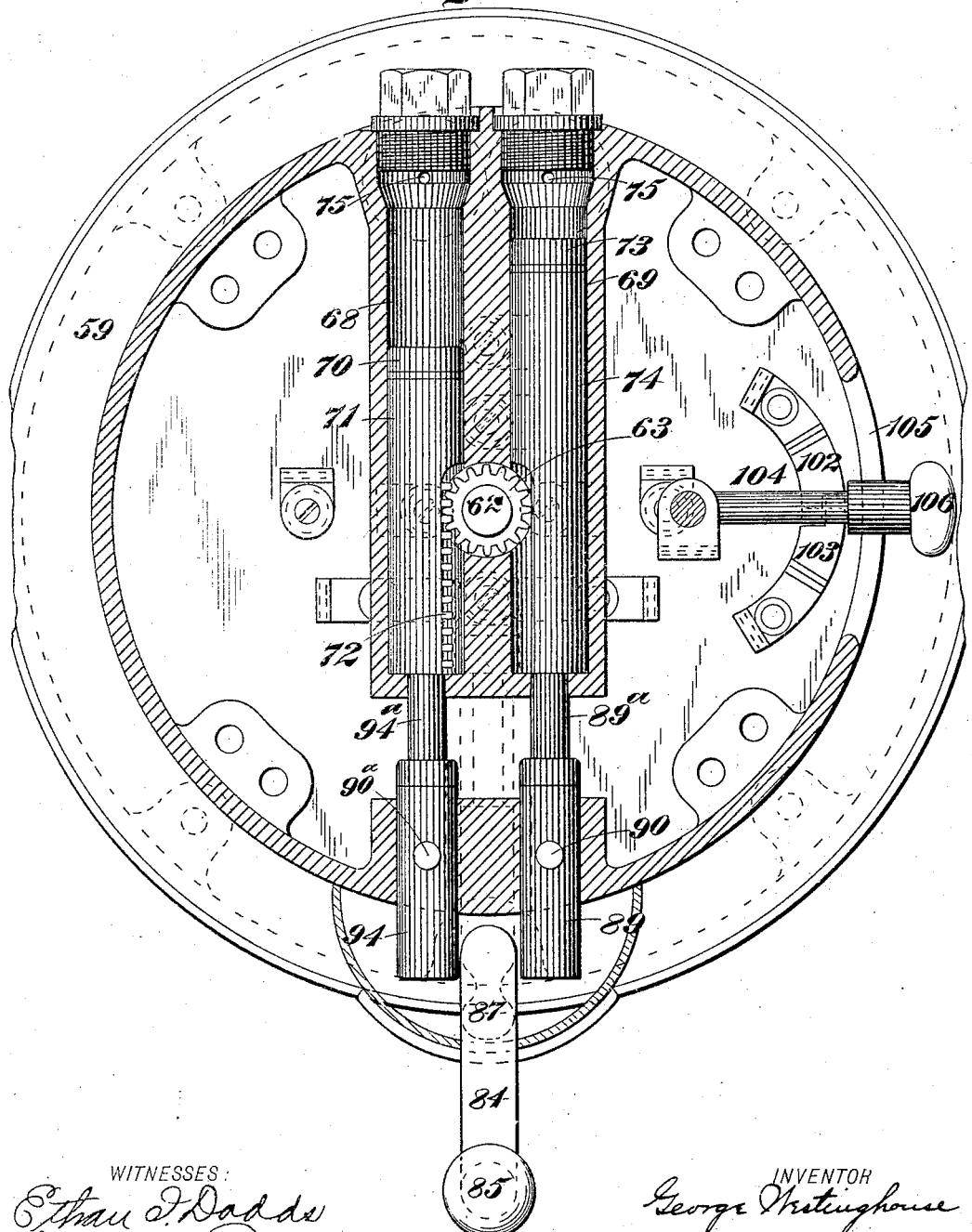

No. 624,277. Patented May 2, 1899.
G. WESTINGHOUSE.
ELECTROPNEUMATIC CONTROLLING SYSTEM.
(Application filed Aug. 20, 1898.)
(No Model.) 12 Sheets—Sheet 7.

WITNESSES: INVENTOR
George Westinghouse
BY
ATTORNEY.

No. 624,277. Patented May 2, 1899.
G. WESTINGHOUSE.
ELECTROPNEUMATIC CONTROLLING SYSTEM.
(Application filed Aug. 20, 1898.)
(No Model.) 12 Sheets—Sheet 8.
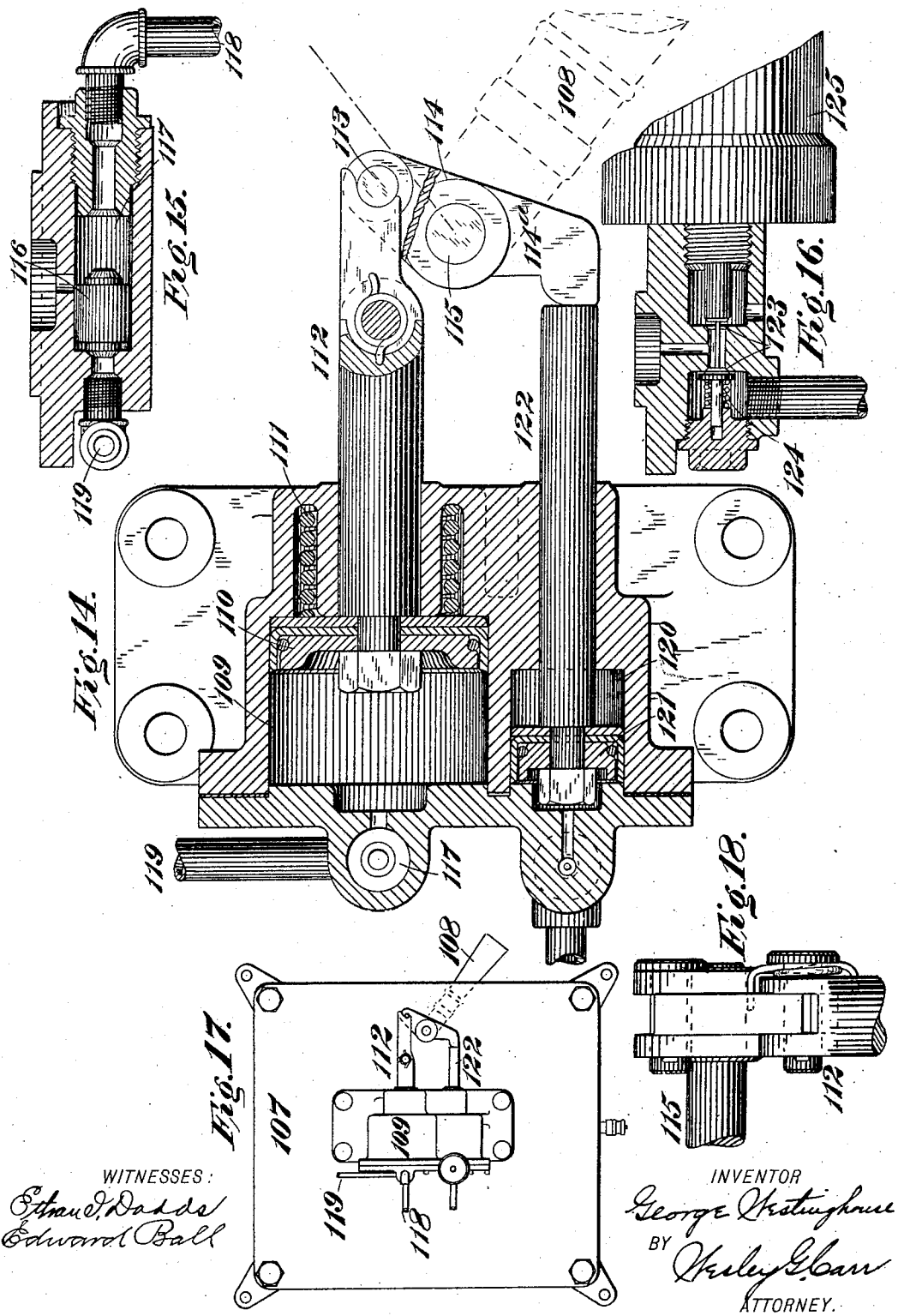
WITNESSES:
INVENTOR
George Westinghouse
BY
ATTORNEY.

No. 624,277. Patented May 2, 1899.
G. WESTINGHOUSE.
ELECTROPNEUMATIC CONTROLLING SYSTEM.
(Application filed Aug. 20, 1898.)
(No Model.) 12 Sheets—Sheet 9.

WITNESSES:
Ethan I. Dodds
Edward Ball

INVENTOR
George Westinghouse
BY
Paley G. Carr
ATTORNEY.

No. 624,277. Patented May 2, 1899.
G. WESTINGHOUSE.
ELECTROPNEUMATIC CONTROLLING SYSTEM.
(Application filed Aug. 20, 1898.)
(No Model.) 12 Sheets—Sheet 10.

WITNESSES:
Ethan I. Dodds
Edward Ball

INVENTOR
George Westinghouse
BY
Wesley G. Carr
ATTORNEY.

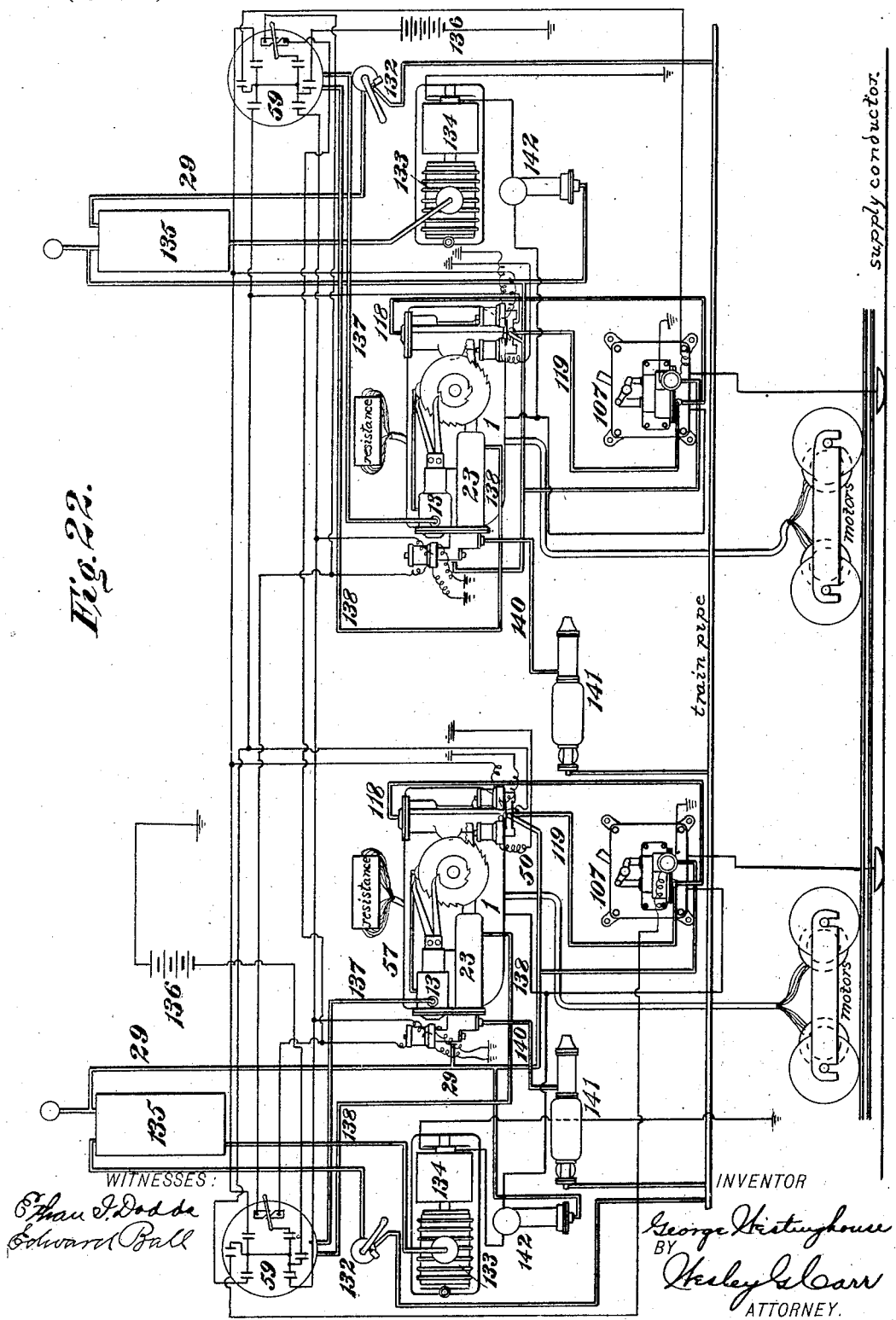

No. 624,277. Patented May 2, 1899.
G. WESTINGHOUSE.
ELECTROPNEUMATIC CONTROLLING SYSTEM.
(Application filed Aug. 20, 1898.)
(No Model.) 12 Sheets—Sheet 12.
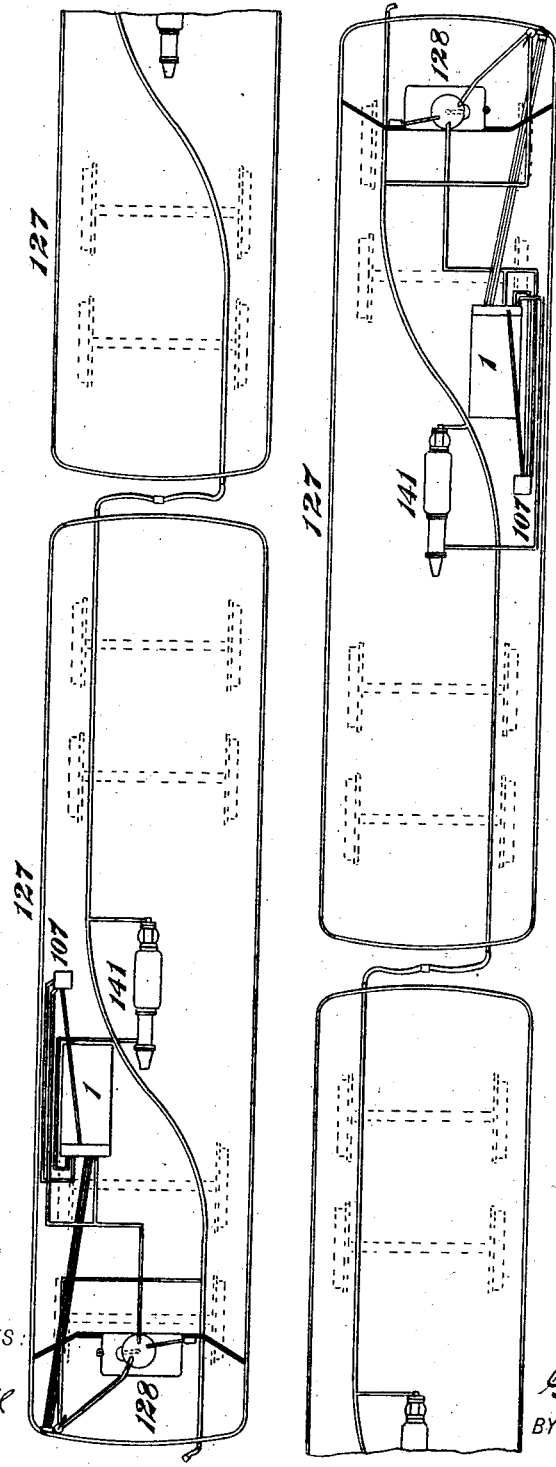
WITNESSES
INVENTOR
George Westinghouse
BY
ATTORNEY.

UNITED STATES PATENT OFFICE.

GEORGE WESTINGHOUSE, OF PITTSBURG, PENNSYLVANIA.

ELECTROPNEUMATIC CONTROLLING SYSTEM.

SPECIFICATION forming part of Letters Patent No. 624,277, dated May 2, 1899.

Application filed August 20, 1898. Serial No. 689,134. (No model.)

*To all whom it may concern:*

Be it known that I, GEORGE WESTINGHOUSE, a citizen of the United States, residing in Pittsburg, in the county of Allegheny and State of Pennsylvania, have invented a new and useful Improvement in Electropneumatic Controlling Systems, (Case No. 789,) of which the following is a specification.

My invention relates to combined fluid-pressure and electromagnetic mechanism for actuating and governing the movement of mechanical or electromechanical devices, and has particular reference to means employed for actuating and governing the movement of railway-motor controllers, although in some of its aspects and features of construction it is susceptible of more general application.

One object of my invention is to provide a simple, compact, and efficient means for utilizing fluid-pressure and so applying the same to a movable device as to effect a step-by-step movement of the same in one direction and a complete-stroke movement in the opposite direction.

A further object of my invention is to provide means for advantageously utilizing fluid-pressure in the operation of an electric-motor controller or a number of such controllers synchronously and to provide electromagnetic means controlled from a more or less distant point or from any one of several such points for governing the fluid-pressure and the actuating mechanism to which it is applied.

A still further object of my invention is to so combine and connect my controlling system with an air-brake system as to make the two systems practically coöperative and as simple and compact in combination and arrangement as is consistent with the service to be performed.

It has been proposed prior to my present invention to equip each of a series of connected railway-vehicles constituting a train with its own equipment of motors, controllers, brake apparatus, &c., and to so connect such vehicles that all of the controllers may be operated and governed from a single point irrespective of the number in service, thus rendering it feasible to employ either a single car or a train of cars and in the latter case to control the application of power to all of the cars from a single point. In cases like this where a plurality of circuit controlling and regulating switches are located at more or less widely-separated points and it is desired to operate them all from a single point it is practically essential to employ some flexible means, such as fluid-pressure or electrical energy, for transmitting and applying the necessary power. In my Patent No. 524,749, granted August 21, 1894, I have shown means for utilizing fluid-pressure to effect such a result.

My present invention also embodies mechanism actuated by fluid-pressure for operating the controller or each of the controllers, if several are in use; but instead of employing special train-pipes and manually-operated valves I propose to supply the fluid-pressure from either the brake train-pipe or from a main reservoir on the same car with the controller and to actuate and control the necessary valves by means of an electromagnetic system, the arrangement being such that the corresponding valves of each controller-operating mechanism in service may be simultaneously operated from any selected point on any car in the train, the combination and arrangement being such, moreover, that a single car may be operated with the same facility, the only couplings necessary in addition to those employed in trains controlled by air-brakes and heretofore in use being those for the electric conductors, which carry the necessary current for energizing the electromagnets of the system.

Figure 13:
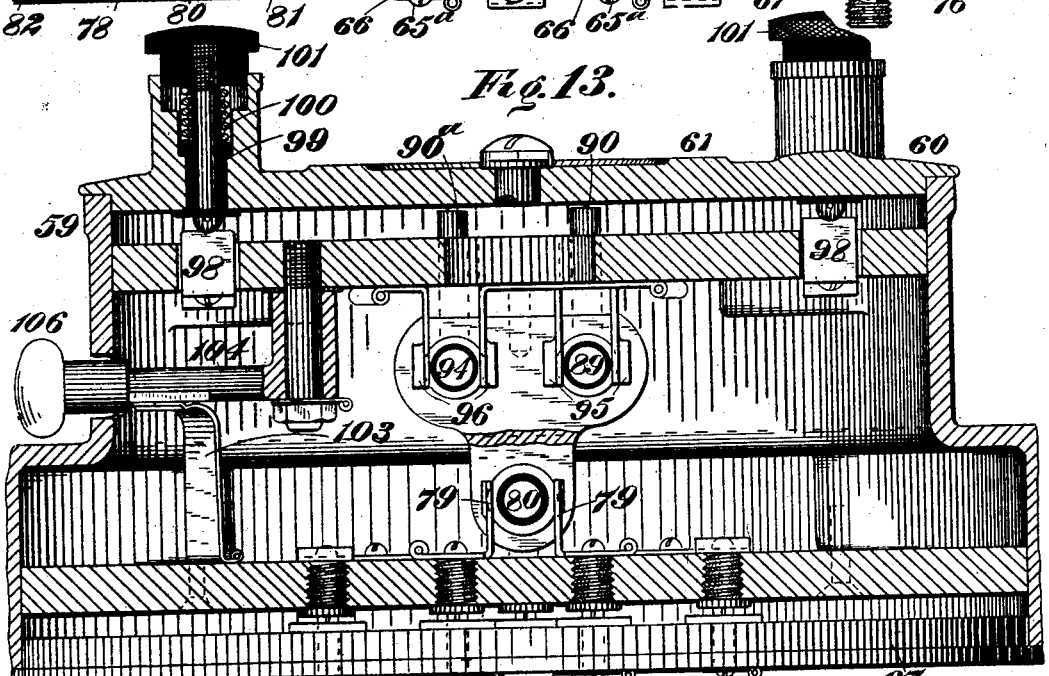
Figure 19:
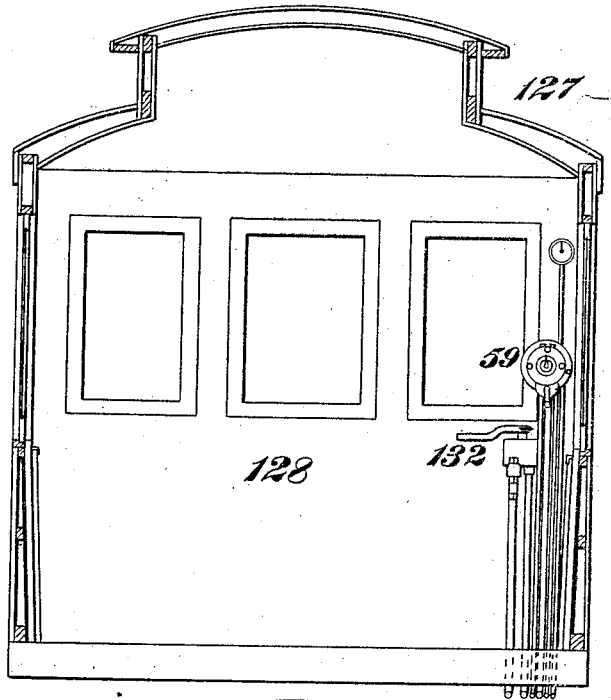
Figure 20:
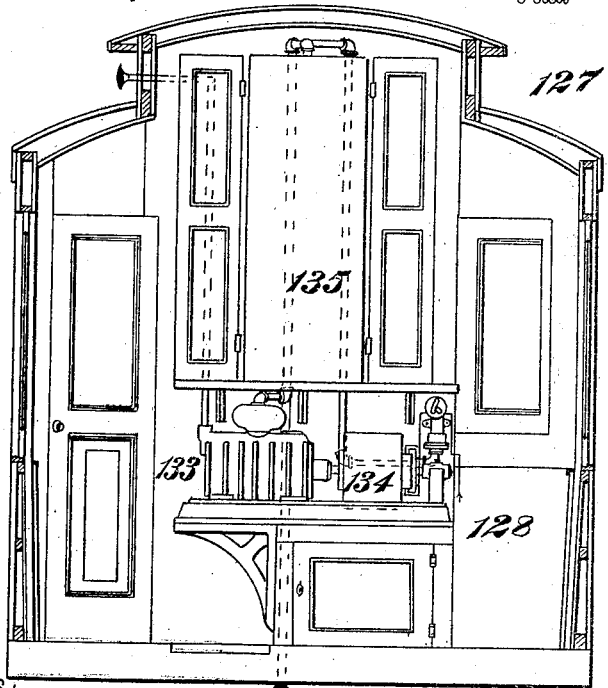
Figure 21:
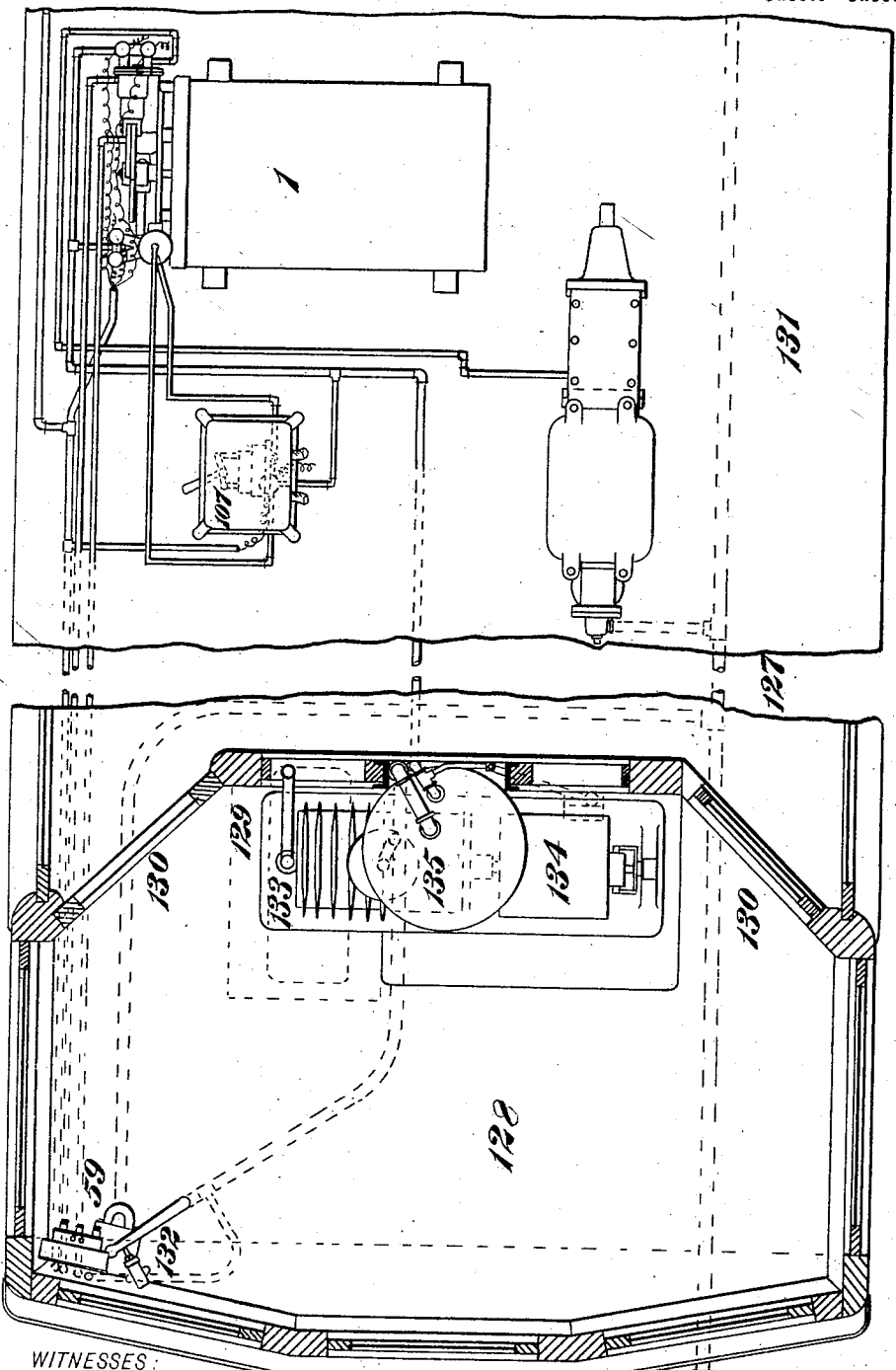

In the accompanying drawings, Figure 1 is a side elevation of the controller-operating mechanism, and Fig. 2 is a similar view of the side opposite that shown in Fig. 1. Fig. 3 is a view, partially in plan and partially in section, of the controller-operating mechanism. Fig. 4 is a sectional detail view taken on line IV IV of Fig. 6, and Fig. 5 is a sectional detail view taken on line V V of Fig. 3. Fig. 6 is a view, partially in front elevation and partially in section, of the controller-operating mechanism. Fig. 7 is a detail sectional view of a portion of the mechanism shown in Fig. 6. Fig. 8 is a front elevation of the indicating and synchronizing device. Fig. 9 is a central sectional view of approximately one-half of the device shown in Fig. 8. Fig. 10 is a front elevation of the indicating and synchronizing device, the cover-plate and pointer being removed. Fig. 11 is a sectional view of the synchronizing and indicating device, taken on a plane parallel to the face of the instrument. Fig. 12 is a central sectional view on a plane perpendicular to the face of the instrument, and Fig. 13 is a similar view on a plane at right angles to that of Fig. 12. Fig. 14 is a detail view, mainly in section, of a circuit-breaker attachment. Fig. 15 is a sectional view of a check-valve for use in connection with the device shown in Fig. 14. Fig. 16 is a detail sectional view of the valve mechanism for the circuit-breaker-tripping device of Fig. 14. Fig. 17 is a plan view of the circuit-breaker. Fig. 18 is a detail view of a portion of the circuit-breaker-setting mechanism. Fig. 19 is a transverse sectional view through the motorman's compartment of a car equipped with my electropneumatic system and looking toward the front. Fig. 20 is a view similar to Fig. 19, but looking toward the rear of the car. Fig. 21 is a plan view of the principal elements of my controlling system and a portion of a car to which they are applied shown in section and in two parts. Fig. 22 is a diagram showing all of the mechanism and the operating and controlling circuits, both electric and pneumatic, for two cars of a train. Fig. 23 is a diagram of a three-car train, the front and rear cars of which are motor-cars and shown as provided with the fluid-pressure apparatus employed in my controlling system.

I will now describe the details of my operating mechanism and the means for regulating and controlling the application of fluid-pressure as they have been worked out by me in practice, it being understood, however, that the details may be considerably modified without departing from the invention.

That portion of my invention by means of which a step-by-step mechanical movement is effected is shown as applied to a controller for electric motors, and for convenience it will be so described. It will be understood, however, that this feature of my invention is adapted and may be used for imparting either a rectilinear movement or a rotary movement to any mechanical device that is suitably supported and guided.

I will first describe the controller-operating mechanism, reference being had to Figs. 1 to 7 of the drawings.

1 is a controller the drum 2 of which is shown as operated from a separate shaft 3 by means of gears 4 and 5. (See Fig. 6.) It will be understood that in lieu of this construction any other character of gearing may be employed or that the shaft may constitute a continuation of the drum-shaft, either as an integral part of it or as a separate shaft coupled to it.

A single main casting may be made to inclose the principal operative parts of the mechanism constituting my invention, as is indicated in the drawings, and this casting may be bolted or otherwise fastened to the cap-plate 6 of the controller-frame. The shaft 3, which may be provided with ball-bearings, as indicated in Fig. 7, has rigidly fastened to it a relatively large toothed disk 7 and a relatively small toothed disk 8. In the present instance these are shown as parts of an integral structure. While this is the more convenient construction, the disks may be made separately and rigidly fastened together by any convenient means, if desired.

The disk 7 is provided with two sets or groups of ratchet-teeth 9 and 10, as indicated in Fig. 3, the group 9 corresponding to a series connection and the group 10 to a parallel connection of the motors.

The disk 8 is shown as provided with a tooth 11 in advance of the group of teeth 9 and with two teeth 12 located substantially midway between the two groups 9 and 10.

The main casting is provided with a cylinder 13, in which is fitted a piston 14. The stem 15 of the piston 14 projects outside the cylinder 13 and is enlarged to form a head 16. Upon or in this head 16 are pivoted two actuating-pawls 17 and 18, the former being designed to engage the teeth in the ratchet-disk 7 and the latter the teeth in the ratchet-disk 8. The pawl 17 is provided with a laterally-projecting arm 17$^a$ and the pawl 18 with a corresponding arm 18$^a$, each of which rests against a portion 19 of the main casting when the piston 14 is at the outer end of its cylinder, this construction serving to throw the pawls 17 and 18, respectively, out of engagement with the disks 7 and 8. Springs 20 and 21 are respectively interposed between the arms 17$^a$ and 18$^a$ and a portion of the head 16, so that when the piston is moved inward the pawls are immediately thrown forward into engagement with the respective ratchet-disks.

In order to retract the piston 14 and the pawls to which it is connected by means of the stem 15 and head 16, I place a coiled spring 22 in the cylinder 13, which bears at one end against the piston 14 and at the other end against the inner end of the cylinder.

For the purpose of effecting a reverse movement of the controller-drum I provide a cylinder 23, in which fits a piston 24. This piston is provided with a stem 25, having a rack 26, a suitable guide 27 being provided therefor. This rack 26 meshes with a pinion 28 on the shaft 3.

The fluid-pressure for operating the apparatus is admitted through a pipe 29 to the chamber 30, from which it passes into chambers 31 and 31$^a$. (See Figs. 1, 4, and 7.) The cylinder 13 is normally in communication with the atmosphere by means of passages 32 and 33, chamber 34, and passage or port 35, the valve 36 being held away from its seat by the coiled spring 37 and the valve 38 being held to its seat by the same means.

In order to actuate the controller, the electromagnet 39 is energized by closing its circuit, and when thus energized its armature will be drawn inward, and thus force the valve 36 to its seat and unseat the valve 38. The fluid-pressure will thus be admitted to cylinder 13 through passages 33 and 32, and the piston will be forced against the action of the spring 22 the full length of its stroke.

As already described, the springs 20 and 21 will throw the pawls 17 and 18 into engagement with their respective disks 7 and 8 as soon as the movement of the piston 14 has permitted the springs to act.

If the drum is in the off position, as indicated in Fig. 3, the pawl 18 will be moved into contact with the tooth 11 on the disk 8. On account of the smaller diameter of the disk 8 the stroke of the piston will serve to rotate the shaft 3 a sufficient distance to bring the pawl 17 into engagement with the first tooth of the group 9. The circuit of the magnet 39 will now be opened, and, as will be readily understood, the pressure will be immediately exhausted from the cylinder 13 on account of the seating of the valve 38 and the unseating of the valve 36 by the action of spring 37, and the spring 22 will immediately retract the piston 14 and the actuating-pawls 17 and 18. The closing of the circuit of the magnet 39 will serve to repeat the operation as regards the movement of piston 14 and pawls 17 and 18. The corresponding movement of the shaft 3 will be effected, however, by the pawl 17, inasmuch as there is no tooth on the disk 8 in position to be engaged by the pawl 18. The opening of the circuit of magnet 39 will again effect the retraction of the pawls 17 and 18. This operation of closing and opening the circuit will be repeated until the pawl 17 has acted upon the last tooth of the group 9. The next movement of the piston and pawls will serve to move the shaft 3 a long step by means of the pawl 18 acting upon the first tooth 12 on disk 8, the length of the step measured on the periphery of disk 7 being one-half the distance between the two groups of teeth 9 and 10. The next stroke of piston 14 will serve, through pawl 18 and the second tooth 12 of disk 8, to move the shaft 3 another long step. Thereafter the pawl 17 will engage one after another the teeth of the group 10 until the last one has been engaged, when the controller will be in the full-on position. It will be understood that a single ratchet-disk having one set of teeth may be employed in lieu of the two disks shown if a uniform step-by-step movement is desired. During this positive movement of the shaft 3 the pinion 28, engaging with the rack 26, will have moved the piston 24 from the inner to the outer end of cylinder 23. If it is now desired to move the controller to the off position, the magnet 40 will be energized by closing its circuit. This magnet and the construction and arrangement of valves and passages leading to cylinder 23 are substantially the same as the corresponding parts already described in connection with the cylinder 13, except that chamber 41, containing a double check-valve 42, connects the passage 32ª and passage or port 32ᵇ. (See Fig. 3.) It will be seen that the pressure introduced through passages 32ª and 33ª into chamber 41 will move the check-valve 42 so as to uncover port 32ᵇ and will act against the piston 24 to bring the several parts into the position shown in Fig. 3.

The reversing-switch may be of any known or desired construction, and it has, therefore, not been deemed necessary to show it in the drawings. Its movable member will, however, preferably be mounted upon a shaft 43, (see Fig. 3,) provided with a gear-segment 44. A rack 45 for engagement with this gear-segment 44 is formed upon the stem 46, that rigidly connects two pistons 47, each of which is located in a cylinder 48. Fluid-pressure is admitted to a chamber 49 through a pipe 50 and from thence is admitted to the respective cylinders 48 by means of electromagnets 51 and passages 49ª and 50ª and valves 49ᵇ and 50ᵇ, substantially like those shown in connection with cylinders 13 and 23.

In order to prevent the movement of the shaft 3 a greater distance than that corresponding to the stroke of the piston 14 without imposing undue frictional resistance to its rotation, I provide the under side of the larger toothed disk 7 with a number of pins or projections 52, equal in number to the teeth of both disks and spaced apart to correspond to the several movement steps which it is desired to impart to the shaft 3 in its positive operation. A vertical cylinder 53 is located beneath the disk 7 and is provided with a piston 54, the stem 55 of which projects through the top of the cylinder in such position that when the piston is moved upward the outer end of the stem will be engaged by the adjacent pin or projection 52 and stop the movement of the shaft 3. The stem 55 is normally held out of the path of movement of the projections 52 by means of a coiled spring 56 and is provided with a shoulder 55ª in order to prevent its movement a sufficient distance to bind upon the under surface of the disk. Fluid-pressure is admitted beneath the piston through a pipe 57, connected at its other end to the cylinder 13 of the actuating-piston 14, although a passage might be provided in the casting, if desired, to serve in lieu of this pipe 57. The port 58, leading from the cylinder into the pipe or passage 57, is located at such distance from the rear end of the cylinder as to insure the rotation of the shaft 3 a sufficient distance to move the projection 52 last engaged by the stem 55 out of the way of the latter before it is moved upward to engage the next projection in the series.

The apparatus thus far described may be operated by fluid-pressure derived from any source and directed and applied by means of valves operated by electromagnets the circuits of which may be opened and closed by any suitable means located at any desired point or points to which the circuits may be extended.

In order that the controller may be operated with certainty step by step from the off to the full-on position and by a single uniform movement from the on to the off position and in order that the successive steps in the on movement may be indicated to the engineer or motorman as they take place, I have devised the governing and indicating device illustrated in Figs. 8 to 13, which will now be described. It will be understood that a plurality of controllers may be operated in the same manner by the means to be now described and that the device is specially intended to insure the synchronous operation of such controllers, as well as to indicate the successive corresponding steps in their operation.

The casing for the indicating and synchronizing device 59 is shown as circular in form and provided with a removable face-plate 60, on which is an annular scale or dial 61, the divisions of which correspond to the number of movement steps of the controller or controllers; but this precise form is of course not essential. A shaft 62 is mounted in suitable bearings in the casing and is provided with a pinion 63 and a ratchet-wheel 64, the teeth of the latter corresponding in number and spacing to the divisions of the dial. An indicating-pointer 65 is also fastened to the outer end of the shaft in order to coöperate with the scale on the face-plate. A spring-washer 64ª between the face-plate 60 and the ratchet-wheel serves to prevent the ratchet-wheel and shaft from moving too freely. The casing may be supported in position by means of split pins 65ª, engaging in sockets 66 in the supporting plate or framework 67, these pins and sockets serving both as a means for supporting the casing and also as couplings for the electric circuits, substantially in the manner set forth in my Patent No. 560,452, granted May 19, 1896. The casing is provided with two cylinders 68 and 69, arranged side by side. In the former is a piston 70, the stem 71 of which is provided with a rack 72, that meshes with the pinion 63 on the shaft 62. In the latter is a piston 73, the stem 74 of which is cut away on the side next the pinion, so that it may move independently thereof. Provision is made for admitting fluid-pressure into each of these cylinders 68 and 69 in front of its piston through a port 75, with which communicates a hollow stem 76, the engaging portion of the casing being provided with a packing-disk 77, so that while the casing may be readily removed an air-tight joint is made between the stem and its socket when the former is in operative position. The bottom or rear plate 78 of the casing is provided with a pair of contact-terminals 79, in position to be engaged by the inner end of a circuit-closing device in the form of a sliding pin or rod 80, this pin being normally held away from the contact-terminals by means of a coiled spring 81. The outer end of the pin is beveled and rounded and projects into a socket-bearing 82, which extends at right angles to it and is designed to receive the shaft portion 83 of a crank 84, the outer end of the crank being provided with an operating-handle 85. This shaft portion 83 is provided with a peripheral groove 86, so located as to receive the rounded end of the rod 80 when the shaft is forced to its seat in the bearing-socket. The shaft portion of the crank is also provided with a laterally-projecting head 87, that is inserted through an opening 88 of the same form in the casing, the form of the head and opening being such as to prevent the removal of the shaft except when there is a substantial registration of the two parts—i. e., when the handle is in its zero position. The operating-crank is made removable, as shown, in order that the battery-current may be cut off when the governing device is not in use in such manner as to preclude the making of operative circuit connections either by accident or otherwise.

Mounted in the casing, at one side of the crank-shaft, so as to slide freely therein, is a circuit-closing plunger 89, having a portion 89ª projecting into the cylinder 69 and against the piston-stem 74. This circuit-closing plunger 89 is provided with a laterally-projecting pin 90, on which is journaled a pawl 91, having a laterally and rearwardly projecting arm 92. A spring 93 is fastened at one end to the casing and bears at its other end against the short arm 92 of the pawl 91, so as to rock it on its pivot into engagement with the ratchet-wheel 64 and forward sufficiently to rotate the wheel and the indicating-pointer a distance equal to one space on the dial when the circuit-closing plunger 89 is moved inward a distance corresponding to a complete stroke of the crank 84. At the other side of the crank-shaft and adjacent thereto is a second circuit-closing plunger 94, having a laterally-projecting pin 90ª and having also an end portion 94ª, projecting into the cylinder 68 sufficiently to engage the end of the piston-stem 71 when the latter is at the rear end of its stroke. A pair of circuit-terminals 95 is located in the casing in position to be engaged by the circuit-closing plunger 89 when moved inward, and a pair of similar terminals 96 is located in position to be engaged by the plunger 94 when it is moved inward.

It will be understood from the drawings and the foregoing description that when the handle 85 is moved to the right a full stroke from its middle position the projecting head 87 will engage the outer end of the circuit-closing plunger 89 and move it inward to bridge the terminals 95. At the same time the projection 89ª will move the piston-stem 74 and piston 73 forward in the cylinder. If the handle 85 be moved to the left a full stroke, the head 87 will in a similar manner engage the end of the plunger 94 and move it inward to bridge the terminals 96. In order to insure the outward movement of each of these plungers as the other is moved inward in case there should be a tendency of the inner one to stick, I pivot a bar 97 to a stationary portion of the framework in such position as to be engaged by the pins 90 and 90ᵃ, so as to insure the operation desired.

In order to direct the application of the fluid-pressure for operating the reversing-switch, I provide a pair of circuit-terminals 98 at each side of the casing and mount in the face-plate a coöperating circuit-closing plug 99, that is normally held away from the terminals by means of a coiled spring 100 and is provided with a head or button 101 to be pressed inward when desired. At one side I provide also two overlapping terminals 102 and 103, with which coöperates a pivoted contact-arm 104, projecting through a slot 105 in the side of the casing and provided with a handle 106 for moving it on its pivot in order to bring the arm into engagement with either or both of the terminals for a purpose to be hereinafter described.

I will now describe the circuit-breaker setting and tripping devices illustrated in Figs. 14 to 18 of the drawings. The circuit-breaker 107 may be of any known variety employed for interrupting the motor-circuit when the current exceeds a predetermined amount, the means for automatically opening or tripping the circuit-breaker comprising the usual solenoid or electromagnet and core or armature. (Not shown in the drawings.) The handle usually employed for closing or setting the circuit-breaker is shown at 108. In order that the circuit-breaker may be located at any desired point and that it may be set by the motorman or engineer without leaving his station and also automatically by the operation of the reversing switch or switches, I provide a cylinder 109, having a piston 110, normally held at one end of the cylinder by means of a coiled spring 111. I also provide the piston with a jointed rod or stem 112, the free end of which is notched or bifurcated to engage a pin 113 in one end of a two-armed lever 114, that is rigid on the shaft 115, to which the handle 108 is also keyed or otherwise fastened. Fluid-pressure is admitted to the cylinder 109 behind the piston 110 from either of the reverse-switch-operating cylinders 48 by means of a double check-valve 116, (shown in Fig. 15,) the valve being forced to its seat at one end of the cylinder 117 when pressure is admitted to the cylinder from pipe 118 and to its seat at the other end when pressure is admitted through the pipe 119.

In case it is desired to trip the circuit-breaker otherwise than by the action of an abnormal current I provide a second cylinder 120 and piston 121, the stem 122 of the piston projecting into such position as to engage the end of the arm 114ᵃ of the lever 114. Air is admitted to the cylinder 120 behind the piston 121 by means of valve mechanism (shown in Fig. 16) similar in construction and operation to the valve mechanism forming part of the controller-operating mechanism, the valves 123 being actuated in one direction by a coiled spring 124 and in the other direction by an electromagnet 125, the circuit of which is under the control of the engineer or motorman, the circuit opening or closing device 126 therefor being located in the casing of the governor 59 or at any other convenient point within his reach.

Referring now particularly to Figs. 19, 20, and 21, the car 127 is shown as provided with a motorman's compartment 128, separated by a partition 129 and doors 130 from the main portion 131 of the car. In the forward right-hand corner of the compartment 128 are located the synchronizing and indicating device 59 for the controlling system and the engineer's brake-valve 132. At the rear of the compartment, upon a platform raised above the floor, are located a rotary air-pump 133 and an electric motor 134 for driving the same, and above the pump is located the main compressed-air reservoir 135, from which is drawn the compressed air for operating both the brakes and the controllers. The controller, the circuit-breaker, the brake-cylinder, and the pipes for conducting air to and from these several devices are shown as located beneath the floor of the car.

Referring now to Figs. 22 and 23 in connection with the figures already described which illustrate the construction of the different portions of the apparatus employed in the system, I will proceed to describe the operation of the system as a whole and that of the several elements of the system in so far as may be necessary.

It is to be understood that the two equipments shown in Figs. 22 and 23 are indicative of any number that it may be found convenient or desirable to combine in a single controlling and operating system, and that whatever may be the number of cars in the train either the whole or any smaller number may be equipped with motors and controlling apparatus, and that the system may be governed from a single point, so that all of the controllers, if more than one be in service, shall be operated in synchronism. Assuming that the reservoir 135 contains air under the pressure required for operating purposes and that the controllers are in their off position, so that the cars are at rest, and that the other apparatus of the system is in the position indicated in Fig. 22, if the shaft 83 of the crank 84 be inserted into its bearing-socket 82 it will force the pin 80 inward, and thus bridge the circuit-terminals 79, one of which is connected to the positive pole of the battery 136 and the other of which is permanently connected to one of each of the pairs of terminals 95, 96, and 98. If the handle 85 be now given a complete stroke to the right, the circuit-closing plunger 89 will be moved inward, carrying the pawl 91 with it, which will serve to move the ratchet-wheel 64 and the indicating-pointer 65 one step. At the same time the circuit will be closed from the positive pole of the battery 136 through the contact-arm 104 and the two overlapping terminals 102 and 103 to both magnets 39 and thence to ground. The action of the magnets 39 will serve to admit air from reservoir 135 through pipe 29 to the cylinders 13, which, acting through the pistons 74 and the pawl and ratchet mechanisms, will move the controllers in synchronism one step. When the piston 14 has reached or nearly reached the limit of its stroke, air will be admitted to the pipe 137 and thence to the cylinder 69, where it acts against the piston 73 and its stem 74 to force the circuit-closing plunger 89 back to its normal position. This is an important feature, since it is desirable that the circuit should remain closed until all the controller-actuating mechanisms have performed their work, and such might not be the case if the handle 85 were too quickly returned to its zero position and means for returning the circuit-closing plunger were employed which acted as soon as the operating-handle was withdrawn. The movement of the handle 85 to the right a full stroke and back to its zero position will be repeated and will each time make and break the circuit in the manner described, and thus cause the controllers to be actuated step by step until the full-on position is reached. The operation of the means for accurately regulating the length of the several steps has been already sufficiently described. If it is now desired to return the controllers to their off position, the operating-handle 85 will be moved to the left the full length of its stroke, thus forcing circuit-closing plunger 94 inward, so as to bridge terminals 96. The magnets 40 will then act to operate the valves 36ª and 38ª to admit fluid-pressure to the cylinders 23, and this pressure acting upon the racks and pinions will quickly return the controller-drums to zero by a single continuous movement. When the pistons 24 reach the ends of their strokes, the ports communicating with pipes 138 will be uncovered and pressure will be conducted to the cylinder 68 to force the piston 70 and its stem backward, thus breaking the circuit of magnets 40 and returning the indicating-pointer 65 to its zero position, all subsequent to the return of the controller-drums to off position. If it is desired to cut the equipment shown at the left in Fig. 22 out of circuit, the handle 106 is moved so that the arm 104 rests only on the terminal-plate 102, and if it is desired to cut the equipment shown at the right out of circuit the handle 106 is moved so that the arm 104 will rest entirely on the other terminal-plate 103. If it is desired to operate the reversing-switch, the proper button 101 will be pressed, thus closing the battery-circuit through the corresponding magnet 51, and the latter will actuate the valve 49ᵇ or 50ᵇ and admit fluid-pressure to the corresponding cylinder 48, so as to act upon its piston 47 and throw the switch. At the same time, by reason of the pipe connections 118 and 119, fluid-pressure will be admitted to the circuit-breaker cylinder 109 and will serve to close the breaker if it is not already in that condition.

If it is desired to set the brakes, the engineer's valve 132 will be operated in the well-known manner, and by reason of the pipe connection 140 between the brake-cylinders 141 and the cylinders 23 for returning the controller-drums to off position the controller-drums will be so returned simultaneously with the setting of the brakes, provided they are not already in the off position.

Instead of automatically opening the power-circuit through the application of the air-brakes by effecting the return of the controller-drum to the off position it might be opened by tripping the circuit-breaker. It will be readily understood that such action would automatically take place simultaneously with the application of the brakes if a pipe connection were made between the brake-cylinder and cylinder 120 of the circuit-breaker like that between the former and cylinder 23.

The requisite air-pressure for operating the various devices is maintained in the main reservoir by automatically making and breaking the circuit of the propelling-motor, the circuit-breaker 142 employed for this purpose being so designed as to cut off the current when the air-pressure in the reservoir reaches a certain predetermined degree and to again make the circuit when the pressure falls to a certain predetermined minimum.

I have not deemed it necessary to specifically describe in every case devices which are old in the art and which are employed in one form or another in every electric-railway system or as a part of the equipment of a railway-vehicle operated by electric motors and provided with air-brakes.

While I have illustrated and described a system the several elements of which have been so designed as to satisfactorily perform the functions for which they are intended, I desire it to be understood that the details of construction and the relative location and arrangement of apparatus and circuits may be materially varied from what is shown in the drawings and hereinbefore described without departing from the spirit and scope of my invention.

I claim as my invention—

1. In a car propelled by one or more electric motors and provided with air-brake mechanism, the combination with a motor-controller, of mechanism for operating said controller connected to a source of fluid-pressure, electromagnetic means for controlling the application of fluid-pressure to said operating mechanism, and means for automatically returning the controlling-switch to the "off" position, depending directly upon the application of the air-brake.

2. In a train of cars, each of a plurality of which is provided with one or more propelling-motors and a controller therefor, the combination with fluid-pressure-actuated mechanism for operating each controller, of electromagnetic means for governing and controlling the application of fluid-pressure to each of said operating mechanisms, and electric circuits and manually-operated circuit making and breaking devices by means of which said electromagnetic means may be energized and deënergized at will to insure a synchronous movement of all the controllers in the system.

3. In a train of cars, each of a plurality of which is provided with one or more propelling-motors and a controller, the combination with fluid-pressure-actuated mechanism for operating each controller, of electromagnetic means for governing and controlling the application of fluid-pressure to said operating mechanisms, and electric circuits and circuit making and breaking devices by means of which the electromagnets may be energized and deënergized at will to insure a synchronous movement of all the controllers in the system and a reversal of the motor-circuits.

4. A reversing-switch-actuating mechanism comprising a cylinder, a piston geared to the movable member of the reversing-switch, valves and electromagnets for actuating said valves positively so as to apply fluid-pressure and thereby effect the operation of the switch in either direction at will.

5. A controller-operating device comprising a cylinder and its piston, means intermediate the piston and the movable member of the controller and serving to move the latter one step for each full stroke of the piston, electromagnetically-actuated means for admitting fluid-pressure to said cylinder to move said piston, means actuated by fluid-pressure to return the controller to its zero or off position and electromagnetically-actuated means for applying said fluid-pressure.

6. A controller for electric motors, in combination with fluid-pressure-actuated means for operating it step by step from the position corresponding to zero speed to the position of maximum speed of the motor or motors, means actuated by fluid-pressure for effecting the return of the controller to the "off" position in a single movement, and electromagnetic mechanism for controlling the application of fluid-pressure for both operations.

7. A reversing-switch-actuating mechanism comprising two rigidly-connected pistons, a cylinder for each piston normally in communication with the atmosphere, valves for cutting off such communication and for admitting fluid-pressure, and an electromagnet for actuating said valves.

8. In a reversing mechanism, the combination with two pistons connected by a rod or stem, a cylinder for each piston normally in communication with the atmosphere and means actuated at will to cut off such communication and admit fluid-pressure to either cylinder.

9. In a controlling system for a train of electrically-propelled cars, the combination with a plurality of controllers and mechanism actuated by fluid-pressure for operating each controller, of governing means for so directing and applying the fluid-pressure as to synchronously operate all controllers in the system step by step, and means for indicating the successive steps in such operation.

10. In a controlling system for a train of electrically-propelled cars, the combination with a plurality of controllers and mechanism actuated by fluid-pressure for operating each controller, of manually-governed electromagnetic means for so directing and applying the fluid-pressure as to operate said controllers synchronously step by step, and means for indicating the successive steps in such operation.

11. A controller for electric motors, in combination with operating mechanism actuated by fluid-pressure, to effect an intermittent or step-by-step movement of said controller, and manually-governed electromagnetic means for controlling the application of the fluid-pressure.

12. A controller for electric motors, in combination with operating mechanism actuated by fluid-pressure, to effect a step-by-step movement of the controller-drum in one direction, electromagnetic means for controlling and directing the application of fluid-pressure to said mechanism, and means actuated by fluid-pressure to return the controller-drum to its zero or off position.

13. The combination with a cylinder and piston and electromagnetically-actuated valves for admitting fluid-pressure to said cylinder and withdrawing it therefrom, a pawl pivotally attached to the stem of said piston and a rotatable disk having teeth to be engaged by said pawl when the piston is actuated by fluid-pressure.

14. The combination with a shaft provided with a toothed disk, of an actuating-pawl therefor, a fluid-pressure-actuated piston to the stem of which said pawl is pivoted, electromagnetically-actuated means for imparting fluid-pressure to said piston and withdrawing it therefrom, and means for moving the pawl into engagement with the disk simultaneously with the initial movement of the piston.

15. The combination with a rotatable shaft having two toothed disks of different diameter, a cylinder, a piston movable longitudinally therein, two pawls pivoted to the stem of said piston, means for admitting fluid-pressure to the cylinder behind the piston and springs for throwing the pawls into engagement with the corresponding toothed disks as soon as the positive movement of the piston is begun.

16. The combination with a shaft provided with a toothed disk, of a pawl, a piston actuated by fluid-pressure to reciprocate the pawl and thus effect a step-by-step rotary movement of the shaft, a pinion on the shaft, and a rack-bar actuated by fluid-pressure to effect a reverse movement of the shaft.

17. The combination with a shaft provided with a toothed disk, of a pawl, a piston actuated by fluid-pressure to reciprocate the pawl and thus effect a step-by-step rotary movement of the shaft, a reciprocating piston provided with a rack-bar, a pinion on the shaft with which said rack-bar meshes and electromagnetically-actuated valves for admitting fluid-pressure to the cylinders and exhausting it therefrom.

18. In a controller for electric motors, the combination with the controller-drum, of two toothed disks of different diameter geared, or otherwise connected, to said drum, a fluid-pressure cylinder and piston, two pawls pivoted to the stem of the piston and normally held out of engagement with the teeth of the disks, electromagnetically-actuated valves for admitting fluid-pressure to the cylinder and exhausting it therefrom, and springs for throwing the pawls into engagement with the corresponding disks, when the piston is positively actuated by fluid-pressure.

19. In a controller for electric motors, the combination with the controller-drum and its shaft, of a disk of relatively large diameter having teeth corresponding to movement steps of one length, a second disk of relatively small diameter having teeth corresponding to movement steps of another length, actuating-pawls for the respective disks, a piston to the stem of which said pawls are pivoted, means for holding the pawls out of engagement with the disks when retracted, means for throwing the pawls into engagement with the disk when positively moved, electromagnetically-actuated means for imparting fluid-pressure to the piston and withdrawing it therefrom and a spring for restoring the piston and pawls to their initial positions.

20. In a controller for electric motors, the combination with a controller-drum and its shaft, of two toothed disks of different diameter connected to said shaft, pawls actuated by fluid-pressure to rotate said disks step by step, a pinion on said shaft and a coöperating rack actuated by fluid-pressure to effect a reversal of the controller-drum at a single stroke.

21. In a controller for electric motors, the combination with the drum and its shaft, of two disks of different diameter having teeth arranged in sets or groups, the sets of teeth on one disk alternating in position with those on the other, of actuating-pawls for said disks and means for reciprocating said pawls, whereby an irregular step-by-step movement of the controller-drum is effected.

22. The combination with a plurality of controllers for electric motors, each of which is provided with a notched disk, a reciprocating pawl and fluid-pressure devices for actuating such pawl, of means for electromagnetically controlling the application of fluid-pressure to all of the pawl-actuating devices simultaneously, whereby the controllers will all be actuated step by step in synchronism.

23. A controlling system for a car or train of cars propelled by one or more electric motors, comprising one or more controllers for each motor-car, a pawl-and-ratchet actuating mechanism for each controller, a fluid-pressure cylinder and piston for each pawl-and-ratchet mechanism, and electromagnetic devices and circuits under control from any desired point, whereby the controllers may be actuated step by step in synchronism.

24. A controlling system for a car or train of cars operated by electric motors comprising one or more controllers for each motor-car, a pawl-and-ratchet mechanism for each controller, a fluid-pressure cylinder and a piston and valves for each pawl-and-ratchet mechanism, an electromagnetic means controlled from any point or any one of several points for admitting fluid-pressure to all of said cylinders and exhausting the same therefrom, whereby the controllers will be synchronously actuated step by step in one direction.

25. The combination with a movable member, of an actuating-handle, a ratchet-and-pawl mechanism for moving said movable member one step for each positive stroke of the actuating-handle, electropneumatic means for imparting a like step-by-step movement to one or more other devices, and means for indicating the successive corresponding steps of the several devices or members.

26. In a system of control for electric-railway motors, the combination with a controller and fluid-pressure-actuated means for operating the same step by step in one direction, of electromagnetic means for controlling the application of fluid-pressure to said operating means, and a synchronizing and indicating device comprising ratchet-and-pawl and circuit making and breaking mechanism, an actuating-handle for imparting one impulse to the ratchet-and-pawl mechanism and effecting one make and break of the circuit of said electromagnetic means by each positive stroke from and return to its zero or initial position.

27. In a controlling system for electric-railway motors, the combination with a controller and ratchet-and-pawl mechanism for operating the same, of fluid-pressure apparatus for actuating the pawl-and-ratchet mechanism to move the controller-drum step by step in one direction, electromagnetic means for controlling the application of the fluid-pressure and a synchronizing and indicating device comprising a ratchet-wheel, means for indicating the successive positions of the controller-drum, a pawl and an operating-handle therefor, the pawl being given one actuating impulse by each positive stroke of the operating-handle.

28. In a controlling system for railway-motors, the combination with a controller having a drum actuated step by step in one direction and continuously in the opposite direction by fluid-pressure, of means located at a more or less distant point therefrom for controlling the application of the fluid-pressure and indicating the successive positions of the controller-drum.

29. The combination with a controller and means actuated by fluid-pressure to operate the same step by step in one direction and continuously in the opposite direction, of governing and indicating means located at a more or less distant point from the controller and comprising a scale and pointer and an actuating-handle, each positive stroke of the handle serving to effect the movement of the controller-drum and the movable member of the indicator each one step.

30. In an operating and controlling system for a train of cars, a controller and one or more motors for each of a plurality of cars in the train, in combination with mechanism actuated by fluid-pressure for operating each controller positively step by step, an electromagnetic system for controlling all of the fluid-pressure-actuated mechanisms, and a manually-operated synchronizing and indicating governor, capable of a step-by-step movement only, and serving to insure the synchronous operation of all the controllers of the system and to indicate the successive steps in such operation.

31. In an operating and controlling system for a train of cars, a controller and one or more motors for each of a plurality of cars of a train, in combination with a pawl-and-ratchet mechanism actuated by fluid-pressure for positively operating each controller, a rack and pinion actuated by fluid-pressure for returning the controller to its initial or off position, an electromagnetic system for controlling the application of fluid-pressure to the several operating mechanisms, a manually-operated synchronizing and indicating governor for said system, each positive stroke of which serves to apply fluid-pressure to the pawl-and-ratchet mechanisms, and the reverse movement of which serves to apply fluid-pressure to the rack-and-pinion mechanisms, and means for automatically returning the indicating device to zero when the controller-drums are returned to zero.

32. In a controlling system for railway-motors, the combination with a controller, of fluid-pressure-actuated devices for operating the same step by step positively, fluid-pressure-actuated means for returning the same to zero by a single continuous movement, a reversing-switch and fluid-pressure-actuated means for throwing the same in either direction, a circuit-breaker for automatically opening the motor-circuit by means of an excessive current flowing therein, means for opening the circuit-breaker by fluid-pressure when desired, fluid-pressure-actuated means for automatically closing the circuit-breaker when the reversing-switch is thrown in either direction, and a manually-operated governor and indicator for controlling the application of fluid-pressure to the controller-drum and reversing-switch, and indicating the successive steps in the positive movement of the controller-drum.

33. An indicating and synchronizing device for electropneumatic controlling systems comprising two circuit making and breaking devices, an indicator, a ratchet-wheel carried thereby, a pawl for operating said ratchet-wheel and connected to one of said circuit-closing devices, a reciprocating handle provided with means for actuating one of said circuit-closing devices and said pawl, when moved in one direction, and for actuating the other circuit-closing device, when moved in the other direction, and means for moving the circuit-closing devices to and maintaining them in open-circuit position when the handle is in its middle or zero position.

34. A synchronizing device for electropneumatic controlling systems comprising a circuit-closing device for each electromagnet or for each set of corresponding magnets in the system, and means for including certain actuating-magnets in the governing-circuits or excluding the same therefrom.

35. An indicating and synchronizing device for electropneumatic controlling systems comprising a circuit-closing device for each electromagnet or for each set of corresponding magnets in the system, means for indicating the successive movement steps of the controller or controllers and means for moving the indicator and one of the circuit-closing devices simultaneously.

36. An indicating and synchronizing device for electropneumatic controlling systems comprising a circuit-closing device for each magnet or set of corresponding magnets of the system, means for indicating the successive movement steps of the controller or controllers, means for moving the indicator and one of the circuit-closing devices simultaneously and means for including certain of the magnets in the system or excluding the same therefrom.

37. In an electropneumatic controlling system for railway-vehicles, fluid-pressure-actuated means for operating the controllers synchronously step by step in one direction and by a single uniform movement in the opposite direction, of an electrical system containing magnets for controlling the application of fluid-pressure, and governing devices operated manually to close the electric circuits and pneumatically to open the same, the pneumatic pressure being transmitted thereto from the controller-operating cylinders as soon as the operation of the controllers is completed.

38. In an electropneumatic controlling system for electric motors, the combination with fluid-pressure-actuated mechanisms for operating the motor controller or controllers, of electric circuits under manual control for governing the application of fluid-pressure and means for indicating to the operator that the controller-operating mechanism has completed its stroke.

39. In an electropneumatic controlling system for electric motors, the combination with fluid-pressure-actuated mechanisms for operating the motor controller or controllers, of electromagnetically-actuated valves for directing the application of fluid-pressure, controlling electric circuits, and a removable operating-handle, the removal of which cuts off the source of current from the controlling-circuits.

40. In an electropneumatic operating and controlling system for railway-vehicles, the combination with the controller-operating mechanism, of brake-setting means and a connection between said means and said operating mechanism whereby the application of the brakes will serve to return the controller-drum to its zero or off position.

41. The combination with a cylinder and its piston and electromagnetically-actuated valves for admitting fluid-pressure to said cylinder and withdrawing it therefrom, of a rotatable toothed disk, and an actuating-pawl for said disk normally held out of engagement therewith but moved into engagement and forward as the operating-piston is moved forward.

42. In a train of electrically-propelled cars comprising two motor-cars, each of which has a controller and operating mechanism, the combination with an electric circuit and a manually-operated circuit making and breaking device for controlling both operating mechanisms in synchronism, of means for breaking the circuit connection to either of the mechanisms for operating its controller positively whereby a motorman at the front of the train may operate the motor upon his own vehicle or that upon the rear vehicle, or both, at will.

43. In an electropneumatic operating and controlling system for railway-vehicles, the combination with the power-circuit and the air-brake system, of means actuated by fluid-pressure derived from the brake-cylinder to automatically break the power-circuit as the brakes are applied.

In testimony whereof I have hereunto subscribed my name this 15th day of August, 1899.

GEO. WESTINGHOUSE.

Witnesses:
  WESLEY G. CARR,
  JAMES B. YOUNG.